Jan. 1, 1935.  J. P. GATY  1,986,261
AIRCRAFT MACHINE GUN CAMERA
Filed Nov. 9, 1933  4 Sheets-Sheet 1
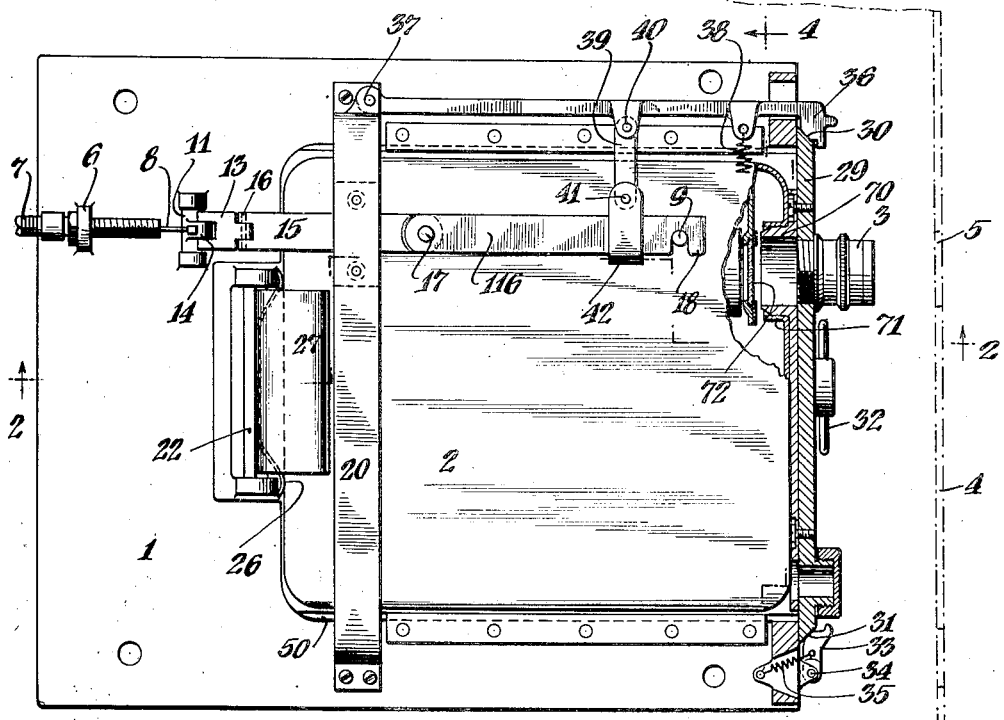
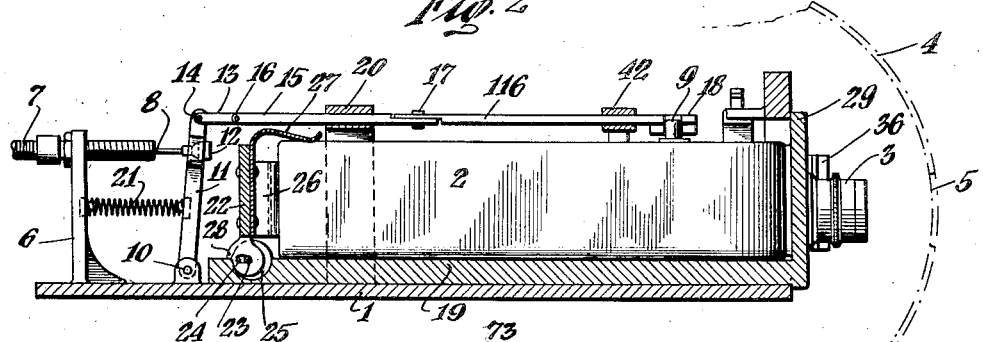
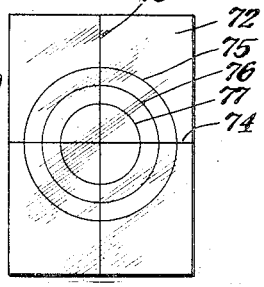
INVENTOR
John P. Gaty
BY Hoguet & Neary
ATTORNEYS

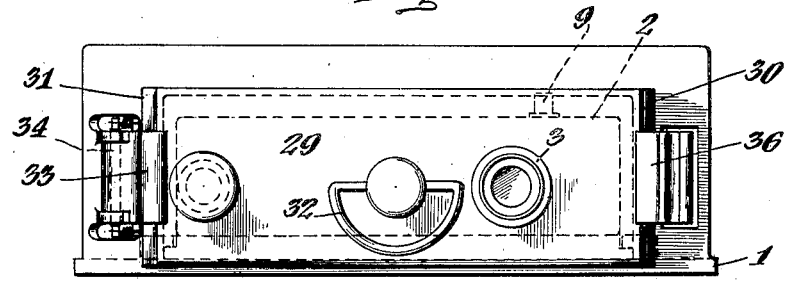
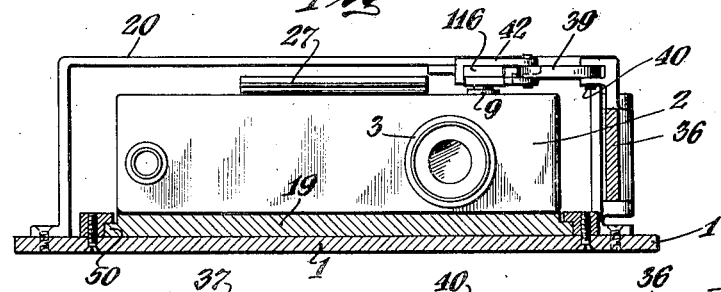
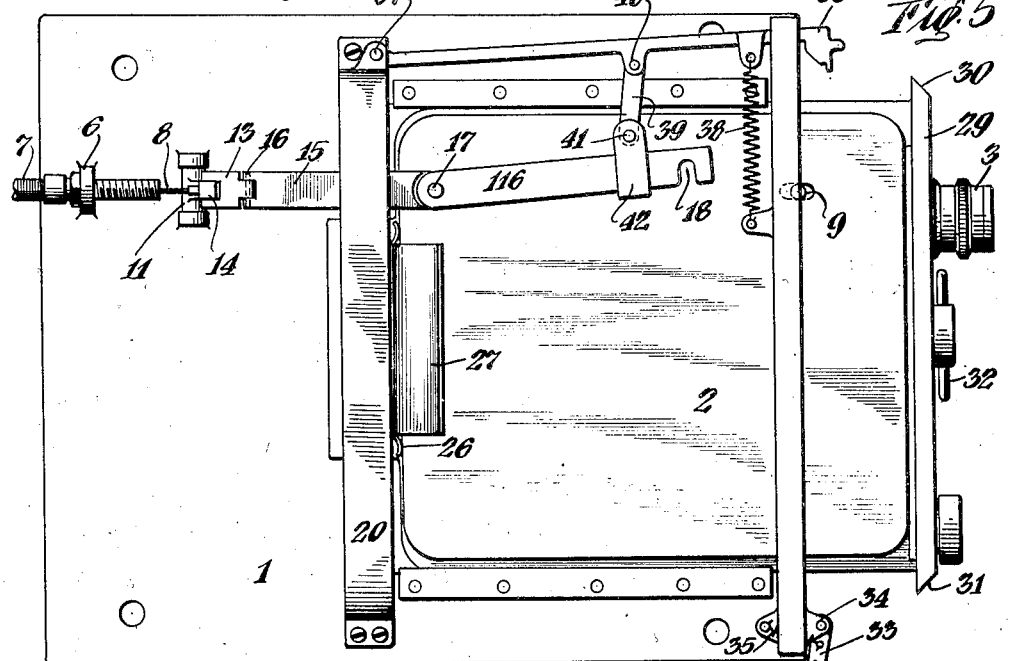

Jan. 1, 1935.    J. P. GATY    1,986,261
AIRCRAFT MACHINE GUN CAMERA
Filed Nov. 9, 1933    4 Sheets-Sheet 3
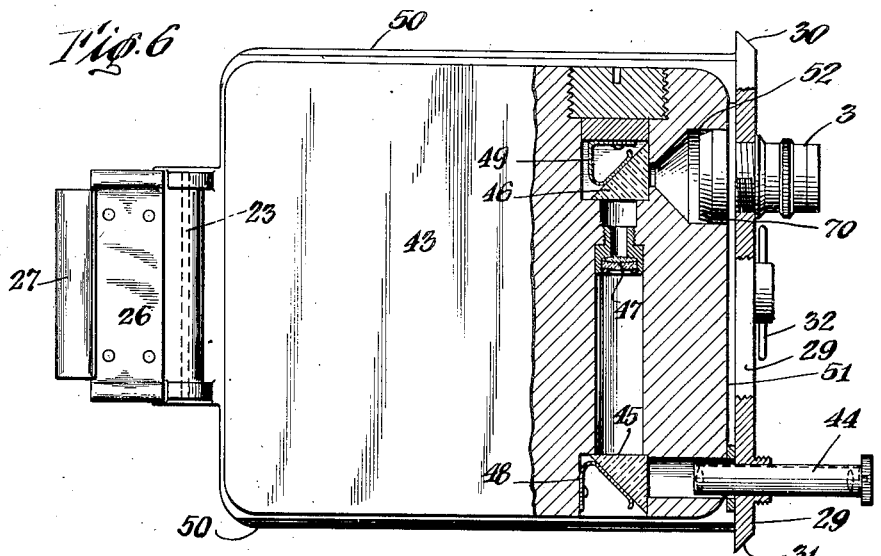
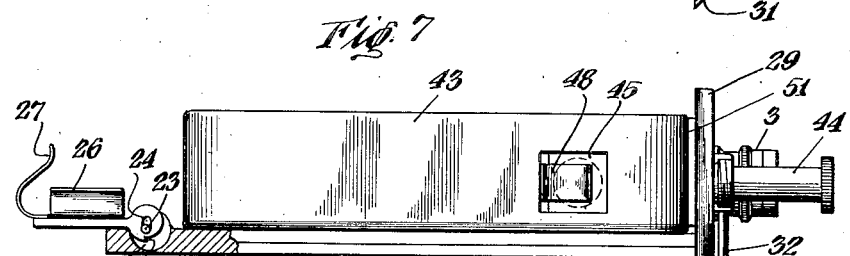
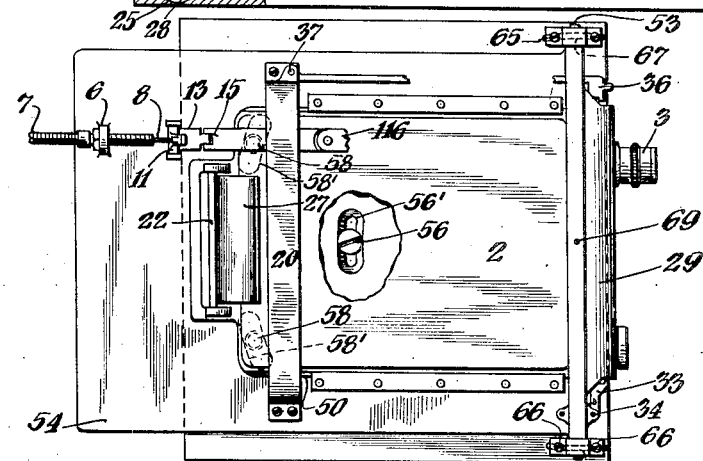
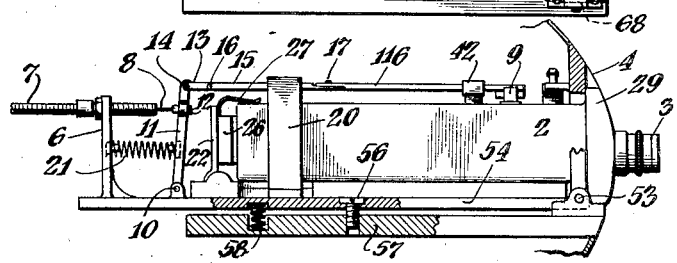
INVENTOR
*John P. Gaty*
BY
ATTORNEYS Jan. 1, 1935.  J. P. GATY  1,986,261
AIRCRAFT MACHINE GUN CAMERA
Filed Nov. 9, 1933    4 Sheets-Sheet 4
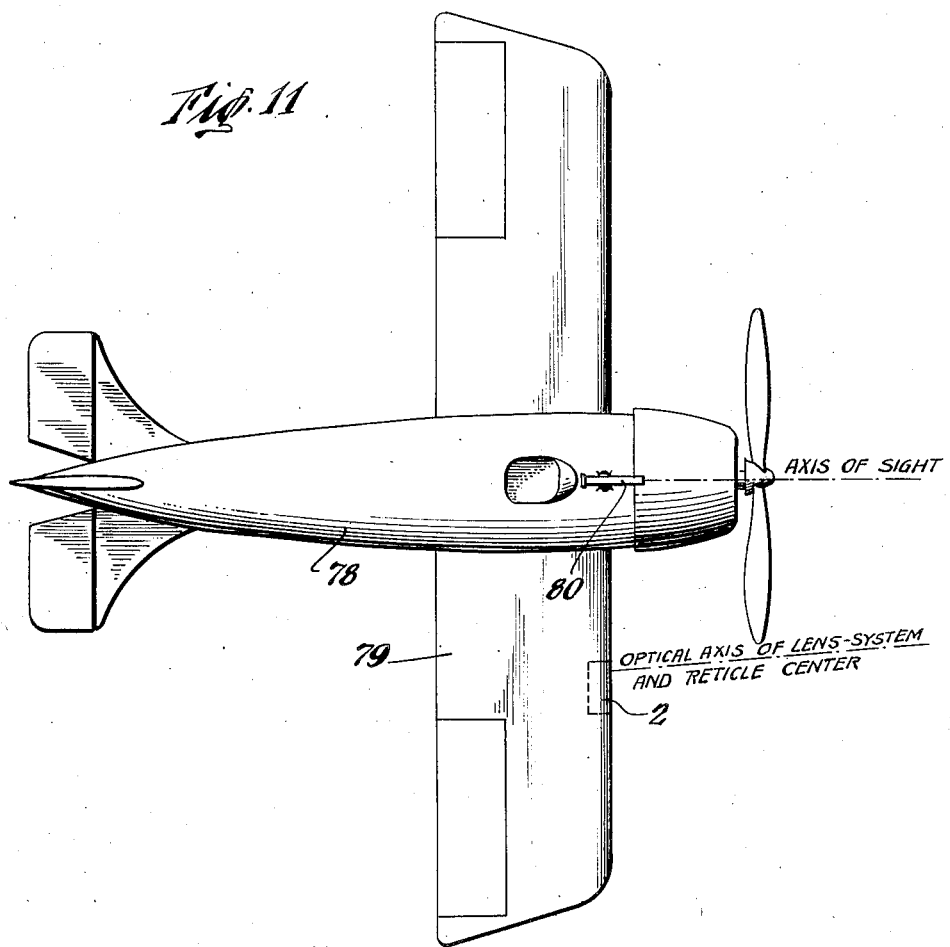
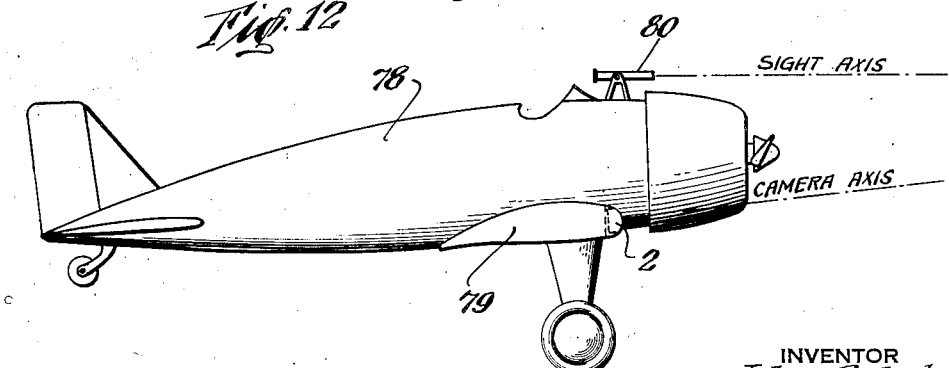
INVENTOR
John P. Gaty
BY Arquet & Neary
ATTORNEYS Patented Jan. 1, 1935

1,986,261

UNITED STATES PATENT OFFICE 1,986,261

AIRCRAFT MACHINE-GUN CAMERA

John P. Gaty, Woodside, N. Y., assignor to Fairchild Aerial Camera Corporation, a corporation of New York Application November 9, 1933, Serial No. 697,255

16 Claims. (Cl. 95—12.5)

This invention relates in general to cameras and more particularly to machine gun cameras and mounts therefor so as to render them adaptable for use in aircraft for training purposes.

Increased speeds of military airplanes have made desirable the complete removal of all projecting parts from the surface of the airplane structure.

It is well known that former machine gun cameras have been located in fixed positions, and attempts have been made to locate them within the airplane structure for the purpose of streamlining. These installations have been unsatisfactory, from both the standpoint of available space, due to the large bulk of former units; and from the standpoint of extreme difficulty of servicing the old type gun cameras when mounted in concealed positions, due to the construction employed.

It is therefore an object of this invention to provide a machine gun camera for training pilots in mock aerial combat, designed to fit within the normal structure of the airplane and offer no increase in wind resistance. It is therefore proposed to provide a fixed installation that will be aligned permanently with the regular machine gun sights with which the airplane is equipped and to arrange the camera so that its operation will be controlled from the pilot's seat by remote control means.

Accuracy in alignment of the machine gun camera with the sights must be positively maintained at all times, and one of the objects of this invention is to satisfy this paramount necessity, and at the same time provide easy service and loading facilities.

The former machine gun cameras were extremely difficult to boresight into alignment with the sights, due to their construction, and another object of this invention is to facilitate the boresighting operation when alignment must be made or checked.

With the foregoing and other objects in view, the invention consists in the combination of parts and in the details of construction hereinafter set forth in the following specification and appended claims, certain embodiments being illustrated in the accompanying drawings, in which:

Fig. 1 is a top plan view of the device partly in section;

Fig. 2 is a view in section taken along line 2—2 of Fig. 1;

Fig. 3 is a view in front elevation of the camera and its mount;

Fig. 4 is a view in section taken along line 4—4 of Fig. 1;

Fig. 5 is a view similar to Fig. 1 showing the camera partially removed from its mount;

Fig. 6 is a view similar to Fig. 1, in which a boresighting device is employed in place of the camera;

Fig. 7 is a side view of that shown in Fig. 6;

Fig. 8 is a view similar to Fig. 1 with a modified form of mount;

Fig. 9 is a side view of that shown in Fig. 8;

Fig. 10 is a view in elevation of the reticle glass;

Fig. 11 is a top plan view of an airplane showing the sighting devices and the camera or gun enclosed within a wing;

Fig. 12 is a view in side elevation of that shown in Fig. 11.

Referring more particularly to the drawings, it is to be understood that the camera is preferably carried within the enclosure of the airplane and moreover may be most conveniently carried within the wing into the interior bracing of which may be suitably attached a main frame base 1.

The camera unit is indicated at 2 and the lens therefor is shown at 3. The camera unit is adapted to be readily removable and self-aligned and positioned automatically as it is placed within the housing provided for by means about to be described.

Figure 2 shows the preferred type of frontal surface 4 of the wing provided with an aperture 5 to admit camera exposure. It is possible, however, that it may be found desirable to extend the lens housing slightly past the leading edge of the wing, without departing from the spirit of the invention.

Integrally carried by the main frame base is an upstanding rigid member 6, to which is attached a hollow cable 7 for housing a movable Bowden control wire 8. This Bowden control wire is preferably carried forward to the cockpit of the airplane for convenient operation by the operator, so as to remotely control the operation of the camera. At 9, there is indicated a shutter pin which when moved to the rear will cause the camera to take a photographic exposure. Pivotally connected at 10 is a lever 11 to which the Bowden control wire is connected at 12. This lever 11 has a short link 13 pivotally connected thereto at 14 and to this link 13 is pivoted at 16 an additional link 15. Link 15 is also pivotally connected to an operating link 116 at 17 and terminates in a hook member 18 for engaging the shutter pin 9 for operation in a horizontal plane. Thus an outward pull on the Bowden control wire to the left as shown in Figure 2 brings about the operation of the shutter pin to release the shutter and effect a photographic exposure. Also connected to the main base 1 is a guide member 20 for the movement of the link 15. The movement of the lever 11 about its pivot 10 is resisted by a compression spring 21 extending between the rigid member 6 and the pivoted lever 11 so as to return the operating lever 16 and the shutter pin into inoperative position after the shutter exposure has been completed in preparation for the next shutter operation.

As stated before, the camera unit is adapted for self-alignment and self-positioning as it is inserted within the frame for containing the same. This is brought about by the provision of suitable spring devices for urging the camera into a predetermined set position upon insertion of the camera into the frame.

Figures 1 and 2 show the camera in its mount in readiness for operation and the spring devices for maintaining the camera in proper position and alignment consists of a member 22 excentrically pivoted to the auxiliary frame 19 at 23. The base of this member 22 is provided with an elongated slot 24 for receiving the pin 23 carried by the auxiliary frame, and the latter is provided with a recess 25 of substantially greater proportions than the cylindrical base of the member 22. The member 22 carries a spring member 26 in front thereof so as to exhibit a resilient force on the inner end of the camera so as to push it forward. Also carried by the member 22 is a spring 27 which exerts a downward pressure on the inner end of the camera so as to assist the spring 26 in maintaining the proper position in alignment with the camera. The cylindrical base member of the member 22 is also provided with a projection 28 which engages the auxiliary base 19 to keep the member 22 in the operative position shown in Figure 2. A manipulation of the member 22 in a forward direction so as to bring the projection 28 within the enlarged slot 25 by sliding the base member along the pin 23 allows the member 22 to be brought into inoperative position, as shown in Figure 7.

Figure 1 shows the front plate 29 beveled at its upper and lower edges at 30 and 31. This front plate also carries a hand grasping member 32 for manual operation in removing the camera from its mount. As stated before, the camera is shown in its proper position in the mount in Figure 1. When it is desired to remove the camera from its mount it is merely necessary to pull forwardly on a catch 33 whch is pivoted at 34 to a frame against the action of a tension spring 35. A pull on the catch 33 beyond its dead center point will allow the spring 35 to snap the catch 33 and hold it in an inoperative position. The next procedure is to pull outwardly on a lever 36, which is pivoted at 37 to the main frame, this being against the action of a tension spring 38 extending between the lever 36 and the frame. The member 36 carries a link 39 pivotally connected thereto at 40, the link 39 being, in turn, pivotally connected at 41 to a guide member 42. This guide member 42 encircles the link 16 so as to guide it in its normal trigger operating functions. However, when the member 36 is manually pulled outwardly, the result is to pull the link 116 upwardly about its pivot 17 so as to release the catch 18 from the trigger pin 9, thus leaving the camera free from any connection so that it may be readily pulled out of its mount. This operation may be more clearly understood by reference to Figures 1 and 5, in which latter figure the camera is shown partially removed from its mount and also in which is shown the inoperative position of the catch 33 and the catch 18 removed from engaging position with the trigger pin 9.

In Figure 6 there is shown a similar arrangement for a unit of substantially the same dimensions as the camera. This unit includes a boresight block 43 which may be substituted for the film chamber and operating mechanism in the subframe. The subframe may be then replaced in the main frame and an alignment automatically follows vertically from the projecting guide edge 50 on both sides in its track in the main frame, and horizontally from the pressure of the subframe clamps pushing the subframe front plate 29 against the main frame front plate. This boresight assembly may consist of the same type of lens 3 and a microscopic draw-tube 44 in connection with suitable prisms 45 and 46 with a microscopic objective 47. The device further consists of a locating surface 51 and a cylinder 70 from which removable assemblies are located. In order to position the prisms 45 and 46, springs 48 and 49 are employed.

The reticle glass 72 is provided with concentric reticles 75, 76 and 77 and with engraved cross marks 73 and 74, as shown in Fig. 10. The locating surface 51 positions the block 43 with respect to the focal plane of the lens 3 so that the front face of prism 46 falls in the focal plane of lens. On the front face of prism 46 there is an engraved cross 73, 74 located exactly with respect to the bore 52, so that its center will occupy the same position as the center of the reticle 77 of the reticle glass 72 in the camera unit 2 when the boresight device is substituted for the former. Referring to Fig. 1, it may be seen that the reticle center is positioned in the same manner from bore 71 in the operating unit 2 so that coincidence of centers will occur upon substituting one for the other, through the registration of the bores 52 and 71 with the cylinder 70. The dimensions to the locating surfaces from the center of the recticle 77 in the camera unit 2 may be standardized so that any camera unit will work interchangeably and locate correctly in any sub-frame of any mount as described.

Figs. 11 and 12 show an airplane with a conventional fuselage 78 and wing 79 in which latter may be housed the camera 2, as previously described. A telescopic sight 80 of the usual type used for aerial machine gunnery and machine gun camera practice is shown mounted on the fuselage for convenient use by the gunner or photographer. The means employed for adjusting the position of the subframe relative to the main frame is utilized in connection with use of the camera unit and the boresighting unit for the purpose of aligning the camera with the telescopic sights and for maintaining the alignment each time the subframe is replaced within the main frame.

It may be found in practice that in addition to the means described for positioning an alignment of the camera and the boresighting assembly that there be provided a main frame construction with adjustment for azimuth and elevation to align the camera with airplane sights. With this in view, there may be provided, as shown in Figures 8 and 9, a tilt bearing 53 carried by the main frame base plate 54 and the main frame front plate. This tilt bearing preferably has azimuth adjustment screws 65 and 66 arranged in suitable slots. The main frame removable base plate is provided with an adjustment screw 56, which extends into the stationary base 57 so as to adjust the camera vertically about the pivot 53. In order to maintain the adjustment effected by the adjustment screw, a compression spring 58 may be provided extending from the base 57 to the main frame removable base plate 54, the spring normally urging the base plate upwardly about the pivot 53.

As shown in Figure 8 there is provided an elongated elliptical slot 56' to allow lateral adjustment of the pin 56 and similar slots to receive the compression springs 58. The base plate also carries the adjustment screws 65 and 66, slidably arranged within elongated curved slots 67 and 68, respectively, so as to allow relative motion therebetween. The effect of various adjustments described in various planes has the effect of determining the point 69 as being the point about which all radii of motion possible takes place.

As shown in Figure 9 the frontal surfaces of the main frame and subframe may be substantially conformed to the shape of the frontal surface of the wing or other portion of the airplane, indicated at 4.

I claim:

1. An aircraft camera mount for housing a camera within the confines of a surface of said aircraft, means for automatically aligning said camera in an accurately predetermined position when placed in said mount, shutter operating means carried by said mount, and control means for engaging and disengaging said shutter operating means.

2. In an aerial photographic apparatus, a camera unit and a mount therefor within the confines of an aircraft surface so as to render said camera removable from said surface, a boresight unit interchangeable with said camera in said mount, means for automatically aligning either said boresight unit or camera unit in a predetermined aligned position when placed within said mount, said boresight unit comprising means whereby the camera may be boresighted from a position directly in front of the camera.

3. In combination with an aircraft, a camera including a lens and a film chamber, a mount for housing said camera within the confines of a surface of said aircraft, a removable self-aligning sub-frame within said mount provided with locating surfaces adapted to receive and align a removable film chamber and driving mechanism with the optical axis of a photographic objective mounted in said removable self-aligning sub-frame.

4. A film camera mount including a subframe, a removable mechanism located within the subframe, a lens located on the subframe, and means for accurately aligning the lens axis with the center of the film aperture in the operating mechanism of said camera.

5. A camera mount including a subframe and a lens mounted thereon, means for obtaining any desired adjusted relationship between the center of the film aperture in the removable operating mechanism of said camera and the axis of said lens, and means for maintaining said adjusted relationship each time the camera operating mechanism is replaced in said subframe.

6. A camera and mount including a camera operating mechanism and a remote control means therefor, said mount comprising a subframe for carrying said camera and a main frame for carrying said subframe, means for disengaging said control means upon the removal of said subframe from said main frame and for automatically engaging said control means with the camera operating mechanism upon the replacement of said subframe within said main frame.

7. In combination with an airplane, a camera and mount carried therein and including a subframe for carrying said camera and a main frame for carrying said subframe, said frames having frontal surfaces substantially conforming to the shape of the surface of that part of the airplane in which the camera and mount are disposed.

8. A camera and mount comprising a main frame and a subframe removably carried thereby and removably carrying a unit comprising a film chamber, operating mechanism and lens, means contained in said unit for automatically aligning and positioning the same in a predetermined relationship with the mount when said unit is replaced within said subframe and the latter replaced within said main frame.

9. In combination with an airplane, a camera carried thereby, a sighting device carried by said airplane, means for boresighting the camera for the purpose of alignment of the camera axis with that of the sighting device from a position directly in front of the camera.

10. In combination with an airplane having fixed sighting devices, a camera and a mount therefor, including a removable portion containing a removable mechanism, a film chamber having a reticle glass arranged in front of the film aperture of said camera, means for automatically aligning the reticle center and the lens axis when said removable mechanism is replaced within the removable frame of said mount, and means for automatically aligning the sighting axis of the camera with the airplane fixed sights when the removable frame is replaced in the main frame.

11. A camera and a mount therefor including a removable mechanism and film chamber, a reticle glass arranged in front of the film aperture of said camera, a boresight device interchangeable for substitution for said film chamber and means for accurately positioning the boresight device so that the boresighting cross therein will occupy the same position relative to the lens axis that is occupied by the reticle center used in the operating mechanism.

12. An aircraft camera mount for housing a camera within the confines of a surface of said aircraft, said camera having interchangeable film chambers and operating mechanism, means for automatically aligning said camera in an accurately predetermined position when placed in said mount, shutter operating means carried by said mount, and control means for engaging and disengaging said shutter operating means.

13. In combination with an airplane, a camera having interchangeable film chambers and operating mechanism and a mount carried in said airplane and including a subframe for carrying said camera, a main frame for carrying said subframe, said frames having frontal surfaces substantially conforming to the shape of the surface of that part of the airplane in which the camera and mount are disposed.

14. In a mount for a film camera, said mount including a subframe, said camera having interchangeable film chambers, and operating mechanism, a removable mechanism located within said subframe, a lens located on said subframe and means for accurately aligning the lens axis with the center of the film aperture in the operating mechanism of said camera.

15. A camera and a mount comprising a main frame and a subframe removably carried thereby and removably carrying a camera unit comprising a film chamber, operating mechanism, and lens; means contained in said main frame, subframe, and removable camera unit for automatically aligning and positioning the said camera unit in a predetermined relationship with the mount when said camera unit is replaced within said subframe and the latter replaced within said main frame.

16. A film camera mount for mounting a removable camera unit and removable mechanism located within a subframe, a lens located on the subframe, and means for accurately aligning the lens axis with the center of the film reticle glass mounted in the said removable camera unit.

JOHN P. GATY.